(12) United States Patent
Pitkäranta

(10) Patent No.: US 8,893,656 B2
(45) Date of Patent: Nov. 25, 2014

(54) APPARATUS FOR COVERING A FEEDING APERTURE OF AN ANIMAL SHELTER AND AN ANIMAL SHELTER

(75) Inventor: Jouni Pitkäranta, Seinäjoki (FI)

(73) Assignee: Arkkitehtitoimisto Jouni Pitkaranta Oy (FI)

( * ) Notice: Subject to any disclaimer, the term of this patent is extended or adjusted under 35 U.S.C. 154(b) by 0 days.

(21) Appl. No.: 13/602,768

(22) Filed: Sep. 4, 2012

(65) Prior Publication Data

US 2013/0055961 A1 Mar. 7, 2013

(30) Foreign Application Priority Data

Sep. 7, 2011 (FI) ...................................... 20115877

(51) Int. Cl.
*A01K 5/00* (2006.01)
*A01K 5/01* (2006.01)
*A01K 1/10* (2006.01)
*A01K 1/00* (2006.01)

(52) U.S. Cl.
CPC ... *A01K 1/10* (2013.01); *A01K 5/01* (2013.01); *A01K 1/007* (2013.01)
USPC .......................... 119/61.3; 119/52.1; 119/449

(58) Field of Classification Search
CPC ......... A01K 1/033; A01K 1/031; A01K 1/03; A01K 1/035; A01K 1/0356; A01K 31/22; A01K 1/10
USPC ......... 119/449, 436, 437, 452, 481, 482, 484, 119/487, 494, 501, 524, 61.1, 61.3, 61.31, 119/58, 52.1, 521; 49/169, 163, 170; 160/330, 335, 336, 349.1, 349.2, 81
See application file for complete search history.

(56) References Cited

U.S. PATENT DOCUMENTS 2,299,173 A * 10/1942 Pidgeon .......................... 160/35
3,602,195 A * 8/1971 Blough ......................... 119/482

(Continued)

FOREIGN PATENT DOCUMENTS

| FI | 119275 | 9/2008 |
| FR | 2775725 A1 | 9/1999 |

(Continued)

OTHER PUBLICATIONS

Patent Search Report, Patent Application No. FI 20115877 May 21, 2012, 2 pages.

(Continued)

*Primary Examiner* — Trinh Nguyen
(74) *Attorney, Agent, or Firm* — Volpe and Koenig, P.C.

(57) ABSTRACT

Apparatus for covering a feeding aperture (240) of an animal shelter (200) comprises at least one first curtain (120) which includes a first edge (122) from which it can be fastened to the upper edge (244) of the feeding aperture, and a second edge (124) which is dimensioned to extend at least close to the lower edge (242) of the feeding aperture when the curtain is hanging freely. The apparatus further comprises a turning mechanism (102, 106, 108, 110, 112) for moving the second edge of the curtain in the first direction towards the interior of the animal shelter and in the second direction away from the interior of the animal shelter. Preferably, the turning mechanism comprises swinging arms (110), that can be arranged to the upper edge of the feeding aperture. The second edge of the first curtain is moved by changing the position of the swinging arms.

15 Claims, 5 Drawing Sheets

(56) References Cited

U.S. PATENT DOCUMENTS

Figure 1A:
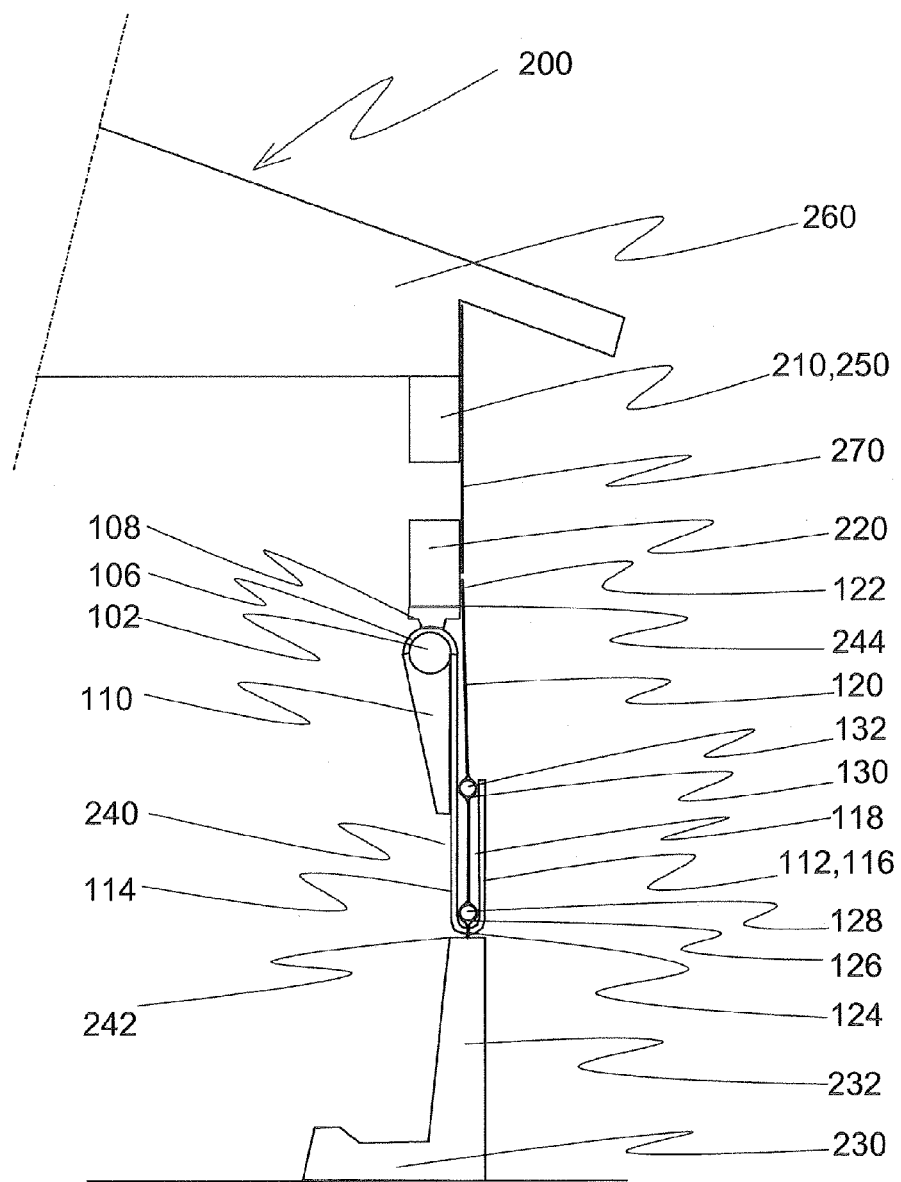

| | | | |
|---|---|---|---|
| 3,690,299 A * | 9/1972 | Johnson | 119/174 |
| 3,802,479 A | 4/1974 | Newell, III et al. | |
| 3,874,118 A * | 4/1975 | Robinson | 49/402 |
| 3,885,524 A * | 5/1975 | Gregory | 119/482 |
| 4,022,263 A * | 5/1977 | Beckett et al. | 160/92 |
| 4,047,331 A * | 9/1977 | Davlantes | 49/171 |
| 4,216,743 A * | 8/1980 | Cohen | 119/484 |
| 4,534,278 A | 8/1985 | Spilde | |
| 4,908,987 A * | 3/1990 | Dickson et al. | 49/169 |
| 4,995,336 A * | 2/1991 | Deemer et al. | 119/484 |
| 5,085,368 A | 2/1992 | Beckman et al. | |
| 5,651,331 A * | 7/1997 | Cleri, Jr. | 119/484 |
| 5,946,855 A * | 9/1999 | Miconi | 49/163 |
| 6,209,489 B1 * | 4/2001 | Akins | 119/61.4 |
| 6,318,296 B1 * | 11/2001 | Nguyen | 119/502 |
| 6,612,359 B1 | 9/2003 | Moreau | |
| 7,913,454 B2 * | 3/2011 | Sullivan | 49/169 |
| 8,220,414 B2 * | 7/2012 | Pitkaranta | 119/52.1 |
| 2010/0116218 A1 * | 5/2010 | Pitkaranta | 119/449 |
| 2010/0236491 A1 * | 9/2010 | Rogge et al. | 119/437 |
| 2011/0155330 A1 | 6/2011 | Schmelzer | |

FOREIGN PATENT DOCUMENTS

| | | |
|---|---|---|
| JP | 07-289106 A | 11/1995 |
| JP | 2001238787 | 9/2001 |
| JP | 3672621 B | 4/2005 |
| WO | 0167851 | 3/2001 |
| WO | 0167851 A1 | 9/2001 |
| WO | 2008125727 A1 | 10/2008 |

OTHER PUBLICATIONS

Search Report issued in corresponding European Patent Application No. 12182011.2 dated Dec. 13, 2013.

* cited by examiner

APPARATUS FOR COVERING A FEEDING APERTURE OF AN ANIMAL SHELTER AND AN ANIMAL SHELTER

The invention relates to an apparatus for covering the feeding aperture of an animal shelter, which feeding aperture comprises an upper edge and a lower edge, which apparatus comprises at least one first curtain which includes a first edge from which it can be fastened to the upper edge of the feeding aperture or above it, and a second edge which is dimensioned to extend at least close to the lower edge of the feeding aperture when the curtain is hanging freely. The invention further relates to an animal shelter with an apparatus according to the invention.

As the number of cattle on farms is increasing, larger amounts of coarse feed are needed in order to feed the livestock. Therefore, farms have to an increasing extent begun using tractor-pulled feed dispenser wagons, from which feed is dispensed to the livestock through a feeding aperture in the wall of the animal shelter.

A feeding apparatus for feeding animals in a cattle house is known from publication WO 01/67851. In this solution, a trough for animal feed is placed outside the cattle house's outer wall line, together with a turning mechanism protecting the trough from weather.

In publication FI 119275, a feeding apparatus is disclosed that is arranged in connection with the feeding aperture in the wall of the animal shelter, and it comprises an air-permeable first wall and a substantially air-impermeable second wall. The first and second wall can be moved to the front of the feeding aperture, in which case the feeding aperture is closed, and away from the feeding aperture, in which case the feeding aperture is open. The first wall is moved by turning the second wall inwards.

Further, curtains are known that are used as walls of animal shelters, the curtains being fastened from their upper edge to a horizontal support structure of the wall, and the lower edge of which is hanging freely in a slot between fixed, vertical support bars. The curtain wall can be opened by rolling it up around the edge bar in the lower edge of the curtain. In this solution, the fixed support bars restricting the lateral movement of the curtain effect adversely the dispensing of the feed to the animal shelter from the feed dispenser wagon through the opened wall.

The object of the invention is to introduce an apparatus for covering the feeding aperture of the animal shelter, and an animal shelter, with which the drawbacks associated with the prior art can be reduced.

The objects of the invention are achieved by an apparatus and an animal shelter, which are characterized by what has been disclosed in the independent claims. Some preferred embodiments of the invention are disclosed in the dependent claims.

The object of the invention is an apparatus for covering a feeding aperture, which feeding aperture comprises an upper edge and a lower edge. The apparatus comprises at least one first curtain comprising a first edge, from which it can be fastened to the upper edge of the feeding aperture or above it, and a second edge which is dimensioned to extend at least close to the lower edge of the feeding aperture when the first curtain is hanging freely. The first curtain can thus be fastened from its first edge either immediately to the upper edge of the feeding aperture or to the structures of the animal shelter above the feeding aperture, such as to the outer wall or eaves structures of the animal shelter. In that case, the freely hanging first curtain covers the feeding aperture substantially completely. The apparatus further comprises a turning mechanism for moving the second edge of the first curtain in the first direction towards the interior of the animal shelter and in the second direction away from the interior of the animal shelter. By means of the turning mechanism the freely hanging second edge of the first curtain can be moved inwards such that between the second edge of the curtain and the lower edge of the feeding aperture a slot is opened, through which feed can be dosed from the feed dispenser wagon moving outside the animal shelter. By turning outwards the second edge of the first curtain a slot can be formed between the second edge of the curtain and the lower edge of the feeding aperture for example for ventilation of the animal shelter.

In a preferred embodiment of the apparatus according to the invention said turning mechanism comprises at least one swinging arm with a first end and a second end. The swinging arms can be arranged to the upper edge of the feeding aperture rotatable about its first end. The second ends of the swinging arms comprise a support member supporting the second edge of the first curtain in transverse direction in relation to the longitudinal direction of the swinging arm. The second edge of the first curtain is moved by changing the position of the swinging arms. The support members in the swinging arms support the first curtain in the transverse direction of the swinging arm, i.e. the support members force the second edge of the first curtain to follow the rotational movement of the swinging arms. The support members, however, allow the movement of the freely hanging second edge of the first curtain in the longitudinal direction of the swinging arm. Preferably, said support member is a slot with a mouth opening that is opened substantially towards the first edge of the first curtain and in which slot the second edge of the first curtain has been adapted to hang freely. Another preferred embodiment of the apparatus according to the invention comprises a shaft, onto which the swinging arms have been fastened from their first end, and support elements for suspending the shaft onto the upper edge of the feeding aperture. The swinging arm is turned by rotating the shaft about its longitudinal axis.

In a third preferred embodiment of the apparatus according to the invention the second edge of said first curtain comprises an elongated edge stiffening. Preferably, the second edge of said first curtain comprises an edge cavity substantially extending along the second edge, and said edge stiffening is a tube or a bar which has been adapted to said edge cavity. Thanks to the edge stiffening the second edge of the first curtain is rigid in the longitudinal direction of the edge, in which case it maintains its linear form in windy conditions and during the turning phase. The edge stiffening also increases the weight of the second edge of the first curtain, whereby the curtain falls better down to a straight position.

In another preferred embodiment of the apparatus according to the invention there is at least one intermediate stiffening in the area between the first edge of said first curtain and the second edge. Preferably, in the area between the first edge of said first curtain and the second edge there is at least one intermediate cavity, and said intermediate stiffening is a tube or a bar which has been adapted to said intermediate cavity. The intermediate stiffening increases the rigidity of the first curtain in the middle area of the curtain, whereby the curtain stays straight even in a strong wind.

In yet another preferred embodiment of the apparatus according to the invention said first curtain has been fastened to the swinging arm at least from one fastening point, which is at a distance from the first edge of the first curtain. In this embodiment, the curtain has been fastened firmly to the swinging arms, whereby the movement of the curtain remains slight. In the curtain, there is a fold in the area between the first edge and the fastening point of the swinging arm, which enables swinging of the swinging arm towards the interior of the animal shelter without stretching out the curtain.

In yet another preferred embodiment of the apparatus according to the invention said first curtain is permeable to light. The first curtain thus acts, in its closed position, as a window, through which natural light can enter the animal shelter. The first curtain can also be an air-permeable, preferably net-like element. Such net preventing birds flying through, a so called bird net, can alone be a sufficient cover for the feeding aperture in summertime, especially in warm countries.

Yet in another preferred embodiment of the apparatus according to the invention the second edge of said first curtain is dimensioned to take a position at least for the most of its length against the lower edge of the feeding aperture. Thus, the joining point between the second edge and the lower edge of the feeding aperture becomes tight enough without a separate sealing.

A further preferable embodiment of the apparatus according to the invention comprises at least a second curtain comprising a first edge, from which it can be fastened to the upper edge of the feeding aperture, and a second edge which is dimensioned to extend at least close to the lower edge of the feeding aperture when the curtain is hanging freely. Preferably said first curtain and said second curtain are movable partly or entirely away from the feeding aperture.

In a further preferable embodiment of the apparatus according to the invention the first curtain and the second curtain have substantially different light-transmission properties. The feeding aperture can thus be covered as required either with the first or the second curtain depending on the weather conditions and the season. It is also possible to use both curtains at the same time for covering of the feeding aperture.

The animal shelter to which the invention relates comprises a feeding aperture with an upper edge and a lower edge, at least one first curtain which comprises a first edge from which it is fastened to the upper edge of the feeding aperture or above it, and a second edge which extends at least close to the lower edge of the feeding aperture when the curtain is hanging freely. The animal shelter further comprises a turning mechanism for moving the second edge of the first curtain in the first direction towards the interior of the animal shelter and in the second direction away from the interior of the animal shelter.

An advantage of the invention is that it enables covering of the feeding aperture with the same material that is used in lining of the fixed parts of the outer wall. In this way, the walls of the animal shelter are provided with a uniform architectural appearance.

A further advantage of the invention is that it reduces the number of visible seams forming on the wall surface of the animal shelter.

A further advantage of the invention is that the maintenance and replacement of the curtain belonging to the apparatus is easy.

Below, the invention is described in detail. In the description, reference is made to the accompanying drawings in which FIG. 1a shows, by way of example, in a section view a feeding apparatus according to the invention, FIG. 1b shows, by way of example, the apparatus shown in FIG. 1a in a position in which the second ends of the swinging arms belonging to the apparatus have moved towards the interior of the animal shelter, FIG. 1c shows, by way of example, the apparatus shown in FIGS. 1a and 1b in a position in which the second ends of the swinging arms belonging to the apparatus have moved away from the interior of the animal shelter, FIG. 2a shows, by way of example, in a section view a preferred embodiment of the apparatus according to the invention, FIG. 2b shows, by way of example, in a section view another preferred embodiment of the apparatus according to the invention and FIG. 2c shows, by way of example, in a section view a third preferred embodiment of the apparatus according to the invention.

Figure 1B:
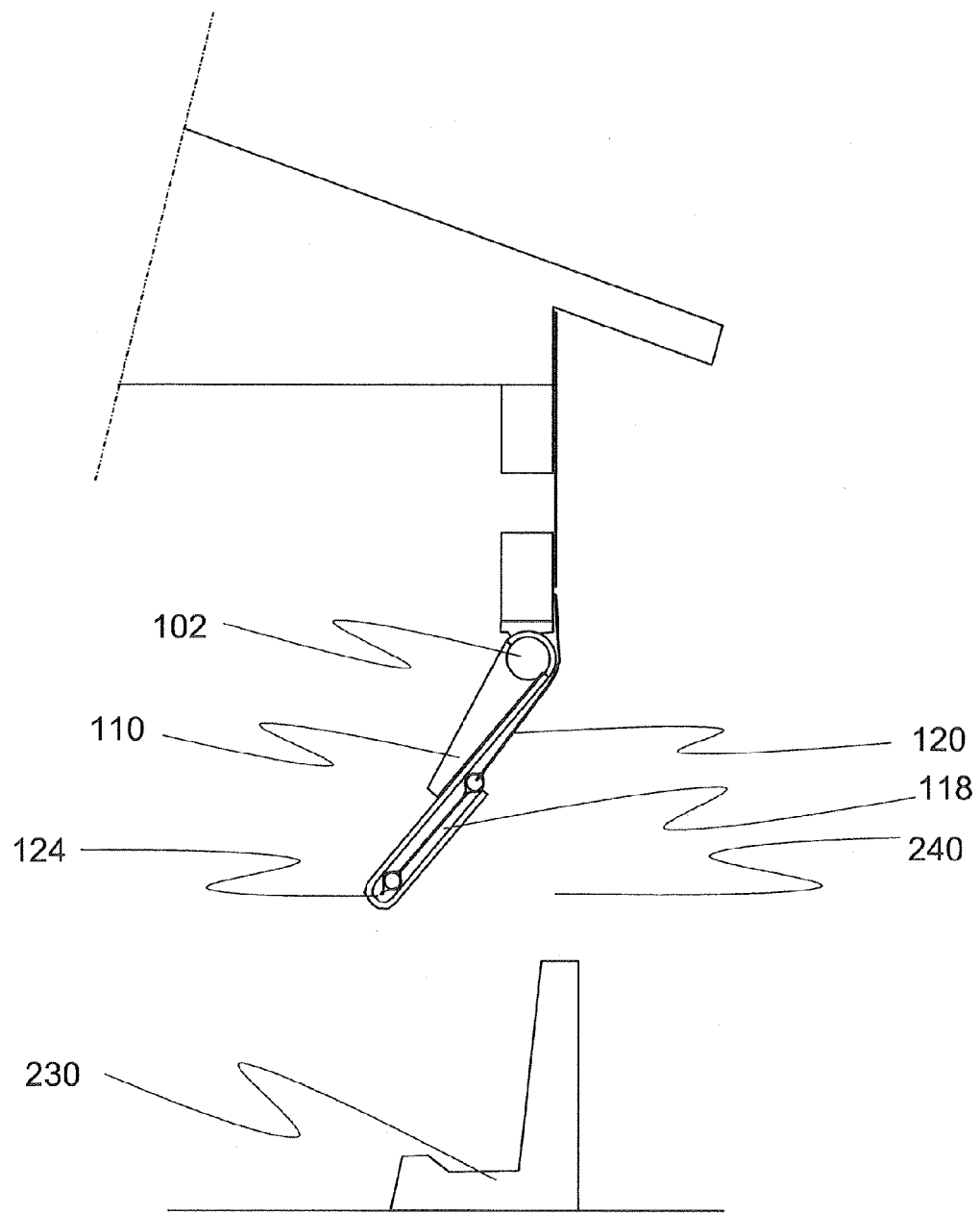
Figure 1C:
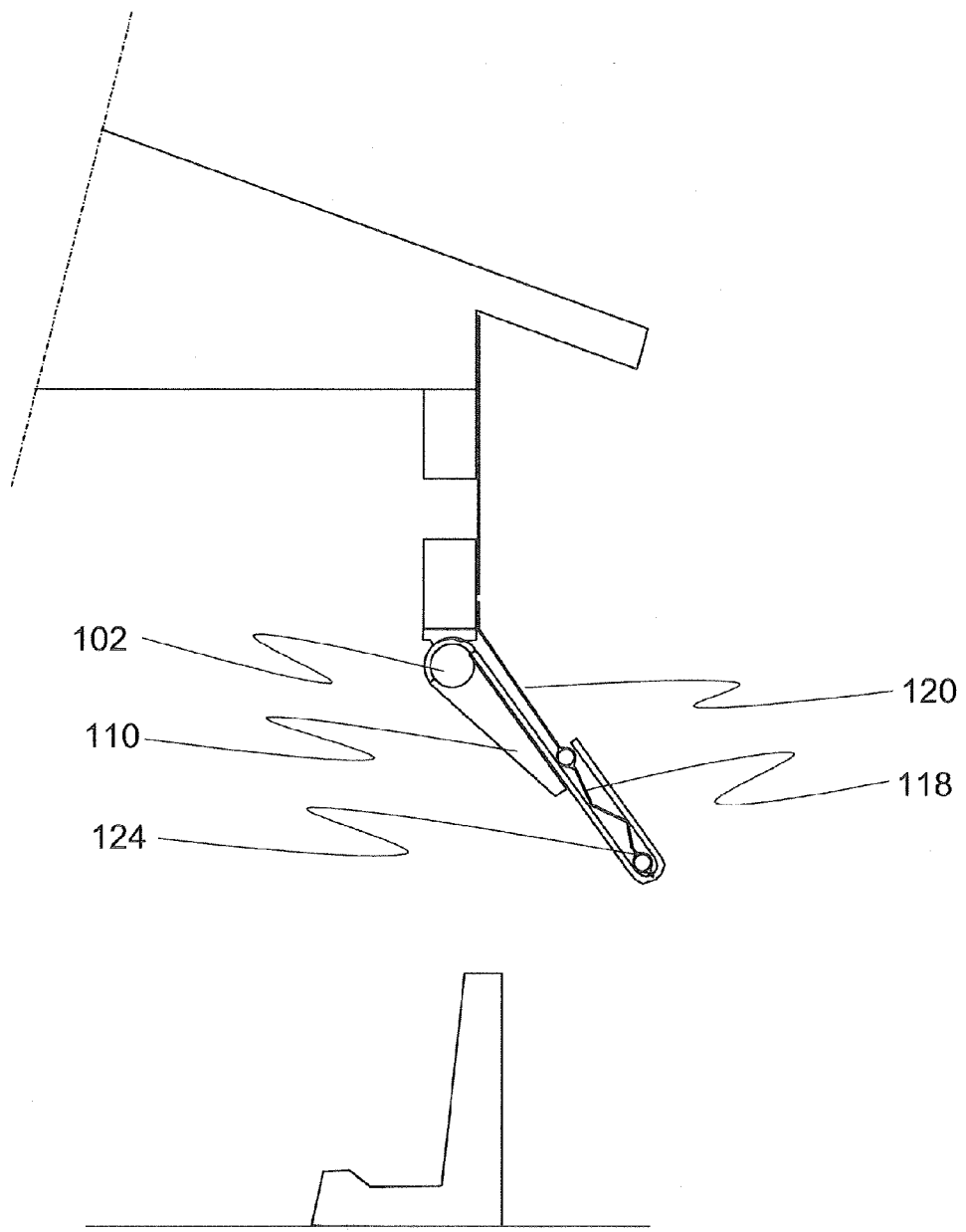
Figure 2A:
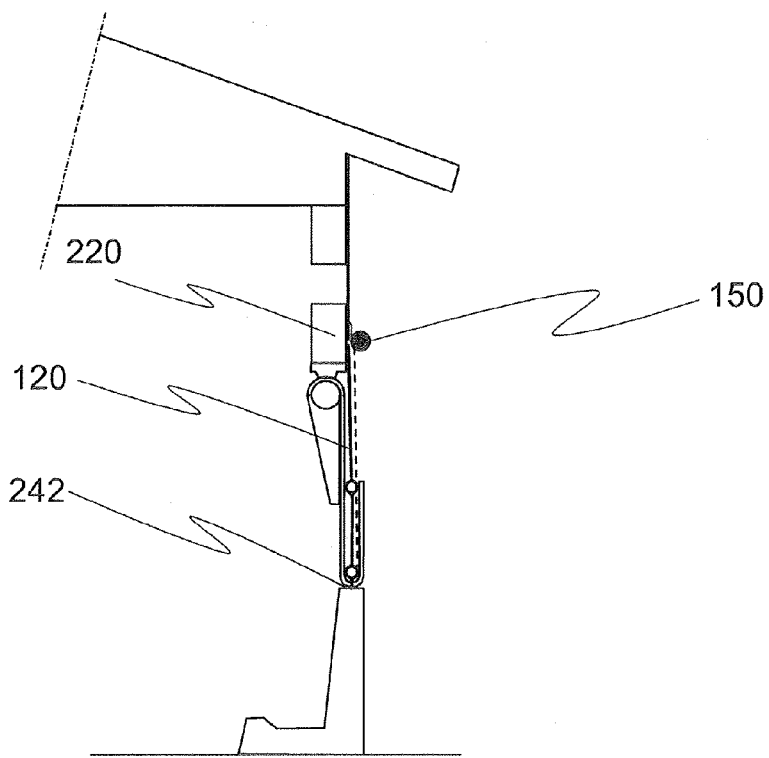
Figure 2B:
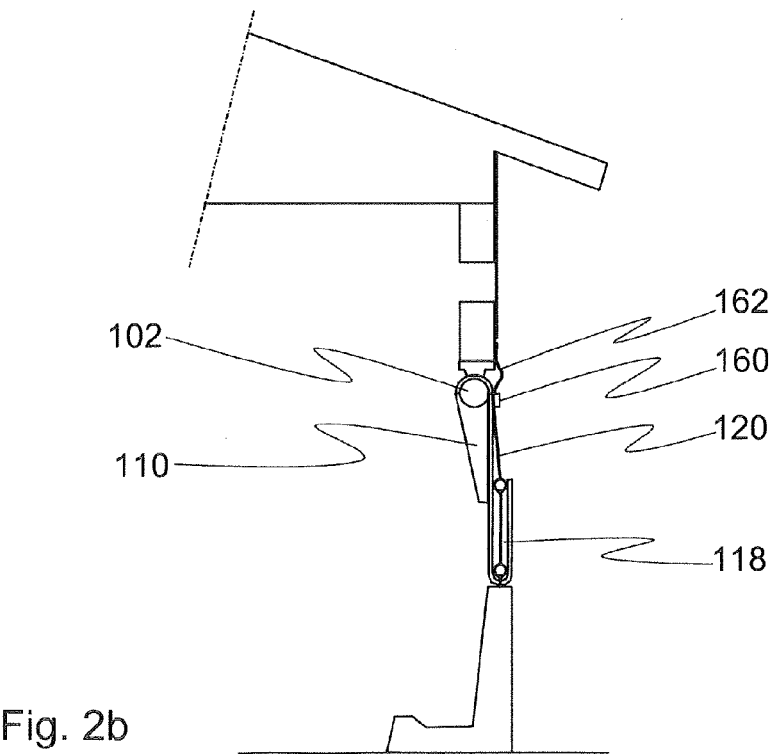
Figure 2C:
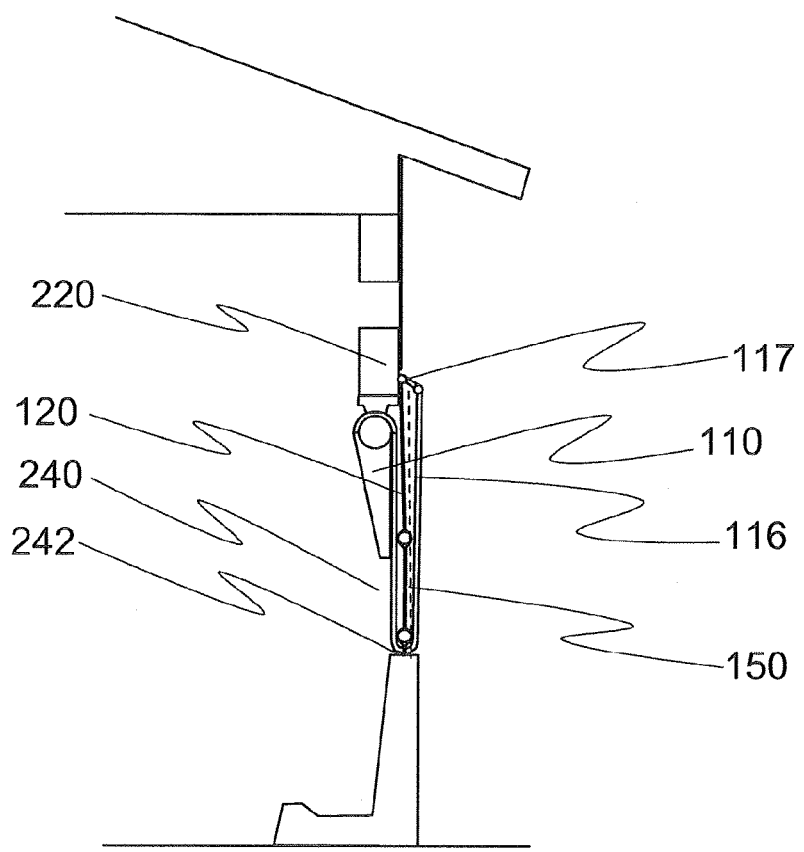

FIG. 1a shows, by way of example, in a section view an animal shelter 200, in which an apparatus according to the invention has been installed. On the outer wall 210 of the animal shelter there is a groove-like feed trough 230, into which the animal feed is dosed through the feeding aperture 240 in the outer wall. The upper edge of the outer wall 232 of the feed trough disposed on the outer wall line forms the lower edge 242 of the feeding aperture. In the upper part of the outer wall there is a horizontal supporting beam 220 the lower edge of which forms the upper edge 244 of the feeding aperture. Right in the upper edge of the outer wall there is a top crossbar on which lattice trusses 260 have been mounted. The portion between the supporting beam and the rafters of the lattice trusses is covered with external cladding 270. As the material of the external cladding any appropriate material can be chosen considering the weather and environment conditions at the site of the animal shelter. In countries with warm climate conditions, the external cladding can be a light- and at least partly also air-permeable fabric-like curtain.

The height of the feeding aperture, i.e. the free space between the upper edge 244 and the lower edge 242 is dimensioned such that it is suited for dispensing of the feed through the feeding aperture. The width of the feeding aperture, i.e. the reach of the feeding aperture in longitudinal direction of the outer wall depends on the structural and architectural solutions of the animal shelter. Considering the effectiveness of the feed dispensing the feeding aperture should preferably be as wide as possible. The outer wall can include several parallel feeding apertures or preferably only one feeding aperture, the width of which is substantially equal to the length of the outer wall.

On the lower edge of the supporting beam, i.e. on the upper edge of the feeding aperture 240 a shaft 102 parallel to the supporting beam is suspended, the length of which is substantially equal to the width of the feeding aperture, i.e. it extends from the first side edge of the feeding aperture to its second side edge. The shaft is suspended from the lower edge of the supporting beam by supporting members that comprise an annular bearing frame 106 and a fastening member 108, from which the supporting member is fastened to the supporting beam. Supporting members have been fastened to the bottom surface of the supporting beam at a distance from each other to such a number that the shaft will be supported securely for its whole length into its position. Thanks to the suspension realized by means of the bearing frame the shaft can rotate about its longitudinal axis upon the supporting members. The apparatus further includes an actuator, such as an engine, which is connected to the shaft by a transmission mechanism, preferably by a gear-chain mechanism. By using an actuator the shaft can be rotated about its longitudinal axis in the direction needed (the shaft and the transmission mechanism are not shown in the Figure).

A plurality of elongated swinging arms 110 that are connected from their first end to the shaft, are fastened to the shaft at a distance from each other. The swinging arms are substantially parallel and dimensioned such that in the position along the direction of the outer wall their second end extends close to the lower edge of the feeding aperture. The second end of the swinging arm comprises a hook 112, the mouth of which opens substantially towards the first end of the swinging arm. The hook comprises a first straight flank 114, which has substantially the length of the swinging arm, and a second flank 116, which is substantially parallel to the first flank and extends from the second end of the swinging arm approximately up to the middle of the height of the feeding aperture. In between the first and the second flanks there is a slot 118 with a substantially uniform width.

In front of the feeding aperture 240 the first curtain 120 is located, which has been fastened from its first edge 122 fixedly onto the side surface on the outer surface side of the outer wall of the supporting beam. Fastening of the first edge can be realized in any appropriate way, such as with nails, rivets or staples. The first curtain can hang freely such that its second edge 124 takes its position inside the slot of the swinging arms and extends substantially for its whole length in contact with the lower edge 242 of the feeding aperture. The second edge of the first curtain comprises a substantially edge cavity 126 along the direction of the second edge, which edge cavity extends over the whole width of the first curtain, i.e. from the first side edge of the first curtain to the second side edge. The edge cavity is formed from a strip of the curtain material, which strip has been sewn at its both edges to the flank of the curtain. Inside the edge cavity there is a metal edge tube 128, which acts as the edge stiffening of the first curtain and as a weight of the lower edge of the first curtain. In the area of the first and the second edge there is an intermediate cavity 130 which is substantially parallel to the edge cavity and formed similarly and with an intermediate tube 132 positioned therein. The intermediate tube forms the intermediate stiffening in the middle of the curtain. The position of the intermediate cavity is dimensioned such that it is placed inside the slot in the swinging arm 110 close to the mouth opening of the slot when the first curtain is in the freely hanging position shown in FIG. 1a. The flanks 114, 116 of the slot of the swinging arm prevent the edge stiffening and the intermediate stiffening from moving in the transverse direction in relation to the longitudinal direction of the swinging arm, but allow the curtain to move in the longitudinal direction of the swinging arm. Thanks to the edge and intermediate stiffenings the first curtain does not flutter even in a windy weather.

FIG. 1b shows, by way of example, the apparatus of FIG. 1a in a position where the shaft 102 has been rotated about its longitudinal axis such that the ends of the swinging arms 110 fastened to it move towards the interior of the animal shelter. The second edge 124 of the first curtain 120 hanging freely in front of the feeding aperture 240 moves then forced by the hooks of the swinging arms along with the swinging arms towards the interior of the animal shelter, i.e. away from the feeding aperture. Between the lower edge of the feeding aperture and the second edge of the first curtain a slit is then opened that extends over the whole length of the first curtain, which enables the dispensing of the feed from a feed dispenser wagon outside the animal shelter to the feed trough 230 inside the animal shelter. When the swinging arms are turning inwards, the first curtain moves in the slot 118 in the longitudinal direction of the swinging arm such that the second edge of the curtain goes upwards from the bottom of the slot. The supporting of the second edge of the first curtain realized by means of a slot prevents the stretching out and tearing of the curtain, when it rotates about the axis.

FIG. 1c shows, by way of example, the apparatus of FIGS. 1a and 1b in a position where the shaft 102 has been rotated about its longitudinal axis such that the second ends of the swinging arms 110 fastened to it move away from the interior of the animal shelter. The second edge 124 of the first curtain 120 hanging freely in front of the feeding aperture moves then forced by the swinging arms along with the swinging arms away from the feeding aperture outwards of the wall of the animal shelter. In the lower edge of the feeding aperture an open slot is then opened, through which the animal shelter is allowed to be ventilated. The first curtain forms upon this open slot a roof which acts as a shade against solar radiation and as a shelter from the rain. When the swinging arms are turning outwards, the first curtain moves in the slot 118 along the longitudinal direction of the swinging arm such that the second edge of the curtain folds loosely into the slot.

FIG. 2a shows, by way of example, in a section view a preferred embodiment of the apparatus according to the invention. In addition to the first curtain, this embodiment includes a second curtain 150, which is fastened at its first edge fixedly to the supporting beam 220. The fastening point of the second curtain is higher up than the fastening point of the first curtain when seen in vertical direction. The second curtain is dimensioned such that when hanging freely, its second edge extends substantially up to the same height with the second edge of the first curtain which is substantially up to the lower edge 242 of the feeding aperture. In FIG. 2a the freely hanging position of the second curtain is illustrated by a broken line. Like the first curtain, also the second curtain can comprise an edge cavity with an edge stiffening and an intermediate cavity with an intermediate stiffening.

In this embodiment, the first curtain 120 and/or the second curtain 150 can be rolled up about the second edge, whereby it moves completely away from the feeding aperture. FIG. 2a shows a situation where the first curtain is hanging freely in front of the feeding aperture and the second curtain is rolled up above the feeding aperture. Alternatively, the second curtain can be put hanging freely and the first curtain can be rolled up above the feeding aperture. The second curtain differs from the first curtain especially in regard to its light-transmission properties such that its light-permeability is clearly smaller than the one of the first curtain. The second curtain is thus suited to be used in an apparatus installed in an animal shelter especially in summertime, when the incoming amount of light has to be restricted to avoid excessive warming in the animal shelter. Accordingly, the first curtain which is more light-permeable, is suited to be used especially in winter time, when the amount of the incoming natural light does not need to be restricted.

Obviously, both curtains can be put hanging freely also simultaneously, if it is considered appropriate. This kind of situation may arise for example at cold nights, when it is desirable to improve the thermal insulation capacity of the outer wall.

By means of the first and second curtains also the embodiment of the invention can be realized, where the first curtain is a so called bird net, the mesh size of which is suited for keeping at least most birds from flying through. Due to its structure, the first curtain is very well permeable to air. The second curtain can be made of light-permeable material which is substantially less permeable to air than the first curtain. The second curtain can even be made of membranous material, which is practically impermeable to air. In this embodiment, the second curtain can be rolled up in summertime, whereby, in summer, in front of the feeding aperture, there is only a bird net suspended from the upper edge of the feeding aperture. The second curtain which protects better against weather is rolled down in front of the feeding aperture for winter time.

FIG. 2b shows, by way of example, another preferred embodiment of the apparatus according to the invention. In this embodiment as well the first curtain 120 is fastened from its first edge fixedly to the upper edge of the feeding aperture and its second edge is hanging freely in the slot 118 of the swinging arm 110. In addition to the above mentioned edge fastening the first curtain is fastened from close to the first edge as well to the first ends of the swinging arms. This fastening has been realized by means of an axial 102 fastening lath 160 positioned on the outer surface of the curtain. The fastening lath is fastened with mechanical fastening members extending through the first curtain to the first ends of the swinging arms and the first curtain again is fastened to the fastening lath. The fastening of the first curtain has been realized such that in the portion between the first edge and the fastening lath a fold 162 is formed, that is the curtain is not tight in this portion. The fold enables turning the swinging arms inwards without the curtain being stretched out or torn. In this embodiment, the first curtain can be fastened to the swinging arms as well at several points in the area between the fastening lath and the second edge of the first curtain, if that is considered appropriate.

FIG. 2c shows, by way of example, a third preferred embodiment of the apparatus according to the invention. In this embodiment, the second side 116 of the hook fastened to the swinging arm 110 extends approximately up to the height of the upper edge of the feeding aperture 240. The second flank is supported at its upwards-pointing end via an articulated arm 117 to the supporting beam 220. The articulated arm is fastened at its first end hingedly to the supporting beam and at its second end hingedly to the upwards-pointing end of the second flank. The articulated arm prevents the upwards-pointing end of the second flank from moving in transverse direction, whereby the second flank acts effectively as a wind support preventing fluttering of the first and/or second curtain 120, 150. The hinged fastening of the articulated arm however allows the upwards-pointing end of the second flank to move when the swinging arm turns towards the interior of the animal shelter or away from the animal shelter.

Instead of the articulated arm the upwards-pointing end of the second flank can be supported onto the upper edge of the feeding aperture 240 also in another way, for example by a flexible or elastic supporting member. The supporting member can also be a rigid piece resembling an upside down letter "L" which is fastened at its shorter branch hingedly to the supporting beam and which comprises a tubular longer branch, which takes its position telescopically around the upwards-pointing end of the second flank. The fundamental idea of the embodiment according to FIG. 2c is that the supporting of the upwards-pointing end of the second flank is in all conditions such that the second flank can act effectively as a wind support for the curtains 120, 150. The supporting however does not restrict turning of the swinging arms in either directions.

Some of the preferred embodiments of an apparatus according to the invention have been described above. The invention is not limited to the solutions described above, but the inventive idea can be applied in numerous ways within the scope defined by the claims.

The invention claimed is:

1. An apparatus for covering a feeding aperture of an animal shelter, which feeding aperture comprises an upper edge and a lower edge, which apparatus comprises at least one first curtain which includes a first edge from which it can be fastened to the upper edge of the feeding aperture or above it, and a second edge which is dimensioned to extend at least close to the lower edge of the feeding aperture when the curtain is hanging freely and a turning mechanism for moving the second edge of the curtain in the first direction towards the interior of the animal shelter and in the second direction away from the interior of the animal shelter, wherein said turning mechanism comprises at least one swinging arm with a first end and a second end, which swinging arm can be arranged to the upper edge of the feeding aperture rotatable about its first end and the second end of which comprises a support member supporting the second edge of the first curtain in transverse direction in relation to the longitudinal direction of the swinging arm.

2. The apparatus according to claim 1, wherein said support member is a slot with a mouth that opens substantially towards the first edge of the first curtain and in which slot the second edge of the first curtain has been adapted to hang freely.

3. The apparatus according to claim 1, comprising a shaft, onto which shaft the swinging arms have been fastened from their first end, and support elements for suspending the shaft onto the upper edge of the feeding aperture.

4. The apparatus according to claim 1, wherein the second edge of said first curtain comprises an elongated edge stiffening.

5. The apparatus according to claim 4, wherein the second edge of said first curtain comprises an edge cavity extending substantially along the second edge, and said edge stiffening is a tube or a bar, which has been adapted to said edge cavity.

6. The apparatus according to claim 1, wherein in the area between the first edge and the second edge of the first curtain there is at least one intermediate stiffening.

7. The apparatus according to claim 6, wherein in the area between the first edge and the second edge of the first curtain there is at least one intermediate cavity, and said intermediate stiffening is a tube or a bar, which has been adapted to said intermediate cavity.

8. The apparatus according to claim 1, wherein said first curtain has been fastened to the swinging arm from one fastening point, which is at a distance from the first edge of the first curtain, and the first curtain comprises a fold in the area between said fastening point and the first edge.

9. The apparatus according to claim 1, wherein said first curtain is permeable to light.

10. The apparatus according to claim 1, wherein said first curtain is permeable to air, preferably a net-like element.

11. The apparatus according to claim 1, wherein the second edge of said first curtain is dimensioned to take its position at least for the most of its length against the lower edge of the feeding aperture.

12. The apparatus according to claim 1, further comprising a second curtain, which second curtain comprises a first edge, at which it can be fastened to the upper edge of the feeding aperture, and a second edge which is dimensioned to extend at least close to the lower edge of the feeding aperture when the curtain is hanging freely.

13. The apparatus according to claim 12, wherein said first curtain and second curtain have substantially different light- and air-permeability properties.

14. The apparatus according to claim 12, wherein said first curtain and second curtain are movable partly or completely away from the feeding aperture.

15. An animal shelter comprising a feeding aperture, which feeding aperture comprises an upper edge and a lower edge, at least one first curtain which includes a first edge from which it is fastened to the upper edge of the feeding aperture or above it, and a second edge which extends at least close to the lower edge of the feeding aperture when the first curtain is hanging freely and a turning mechanism for moving the second edge of the curtain in the first direction towards the interior of the animal shelter and in the second direction away from the interior of the animal shelter, wherein said turning mechanism comprises at least one swinging arm with a first end and a second end, which swinging arm can be arranged to the upper edge of the feeding aperture rotatable about its first end and the second end of which comprises a support member supporting the second edge of the first curtain in transverse direction in relation to the longitudinal direction of the swinging arm.

\* \* \* \* \*